United States Patent [19]
Brandstetter et al.

[11] 3,801,448
[45] Apr. 2, 1974

[54] REMOVABLE TOP SHIELD FOR A NUCLEAR REACTOR CORE

[75] Inventors: Robert Brandstetter, Meschers; Marcel Robin, Sevres, both of France

[73] Assignee: Commissariat A L'Energy Atomique

[22] Filed: Nov. 21, 1972

[21] Appl. No.: 308,405

[30] Foreign Application Priority Data
Nov. 30, 1971  France .............................. 71.42933

[52] U.S. Cl. ...................... 176/40, 176/28, 176/87
[51] Int. Cl. ............................................ G21c 11/00
[58] Field of Search ........................... 176/87, 28, 40

[56] References Cited
UNITED STATES PATENTS

| | | | |
|---|---|---|---|
| 3,715,720 | 2/1973 | Jackson | 176/40 |
| 3,635,792 | 1/1972 | Barker | 176/40 |
| 3,436,544 | 4/1969 | Graf, Jr. | 176/87 |

*Primary Examiner*—Reuben Epstein
*Attorney, Agent, or Firm*—Cameron, Kerkam, Sutton, Stowell & Stowell

[57] ABSTRACT

The removable top shield comprises two rotating shield plugs mounted in eccentric relation for closing the top portion of the reactor vessel and is made up of metallic shielding flasks containing shielding elements and mounted on a frame so as to constitute a cluster unit. The cluster units are supported on flooring elements which are attached respectively to the large shield plug and the small shield plug of the reactor by means of a metallic structure and the flooring being carried on the lateral shields of the reactor core.

4 Claims, 8 Drawing Figures

REMOVABLE TOP SHIELD FOR A NUCLEAR REACTOR CORE

This invention relates to a removable top shield for a nuclear reactor core.

In certain types of sodium-cooled integrated reactors, the reactor core is located within a number of containment structures. The outer containment structure is of concrete, for example, and ensures protection against radiations. This outer structure is closed by two circular shield plugs which are mounted in eccentric relation and serve to gain access to the reactor core. The core proper is surrounded by a lateral shield. The upper portion of said lateral shield is closed by a top shield cover, the intended function of said cover in conjunction with the lateral shield being to slow-down and capture fast neutrons which have escaped from the reactor core in order to prevent contamination of the secondary sodium as this latter passes through the intermediate heat exchangers.

In the case of sodium-cooled fast reactors, the top shield of the reactor core is completely immersed in the liquid sodium. Taking into account the temperature of the sodium, the cover is subjected to high thermal and chemical stresses. If the top shield is constructed in a single piece, it is necessary to change the entire shield system in the event of local damage; this represents a complicated and costly operation.

The precise object of the present invention is to provide a top shield for a reactor core which overcomes the disadvantages mentioned in the foregoing.

Said removable top shield of the reactor core is essentially constituted by metallic cylindrical flasks which contain the shielding elements, said flasks being assembled on a frame provided with a grappling hook at the top portion thereof, said assembly of flasks being so arranged as to constitute a cluster unit, the cluster units being in turn supported on flooring elements which are attached respectively to the large shield plug and small shield plug of the reactor by means of a metallic structural framework, said flooring elements being applied against the lateral shields of the reactor core.

A more complete understanding of the invention will be gained from the following description of one embodiment of the removable top shield of the reactor core which is given by way of example and not in any limiting sense, reference being made in the description to the accompanying figures which show on the one hand the top shield of the reactor core and on the other hand the operations which are necessary for the replacement of part of said shield in the event of damage.

Figure 1:
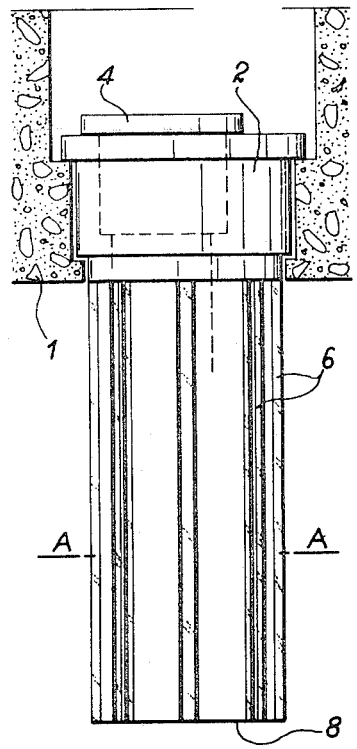
FIG. 1 is a sectional view taken along a vertical plane and showing the structure which supports the removable shield.

The top wall 1 of the reactor vessel is closed by a large rotating shield plug 2 in which a small shield plug 4 is also capable of rotating, said second plug being mounted in eccentric relation to the first.

U-section members such as the member 6 are secured to the large rotating shield plug 2 and to the small rotating plug 4. In order to simplify the figure, there are shown only those U-section members which are attached to the large rotating plug 2. Horizontal circular rings such as the ring 8 have been welded to the lower ends of the U-section members. Flat bars 10 have been fixed between said rings 8 so as to form two horizontal flooring elements, one element being rigidly fixed to the large plug 2 and the other element being rigidly fixed to the small plug 4; it is clear that said two flooring elements are level and so arranged as to cover the reactor core exactly; said flat bars 10 are shown in thin lines in FIG. 2. The cluster units 12 are intended to bear on both flooring elements.

Figure 2:
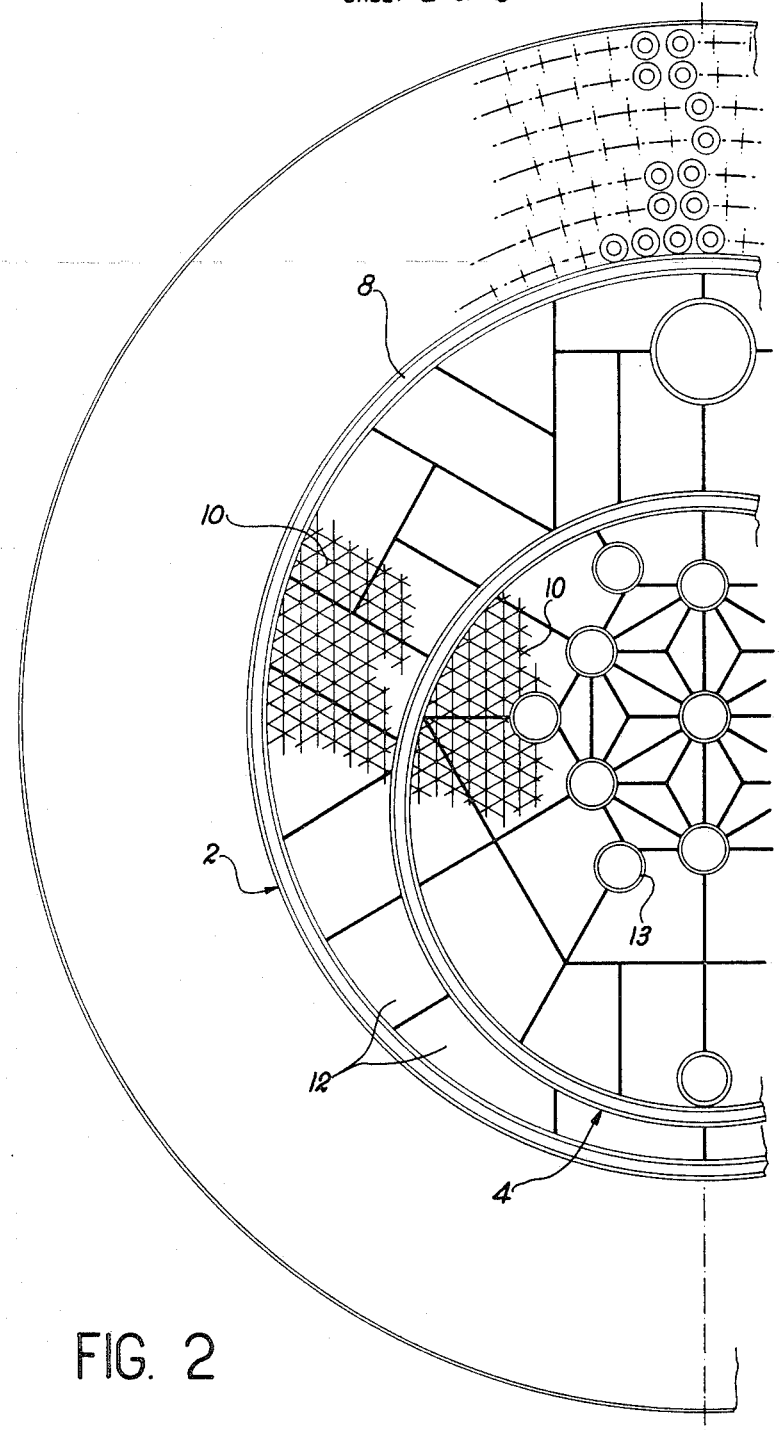
FIG. 2 shows one possible arrangement of the cluster units which constitute the removal shield, this view being taken in section along the horizontal plane A—A of FIG. 1.
Figure 3:
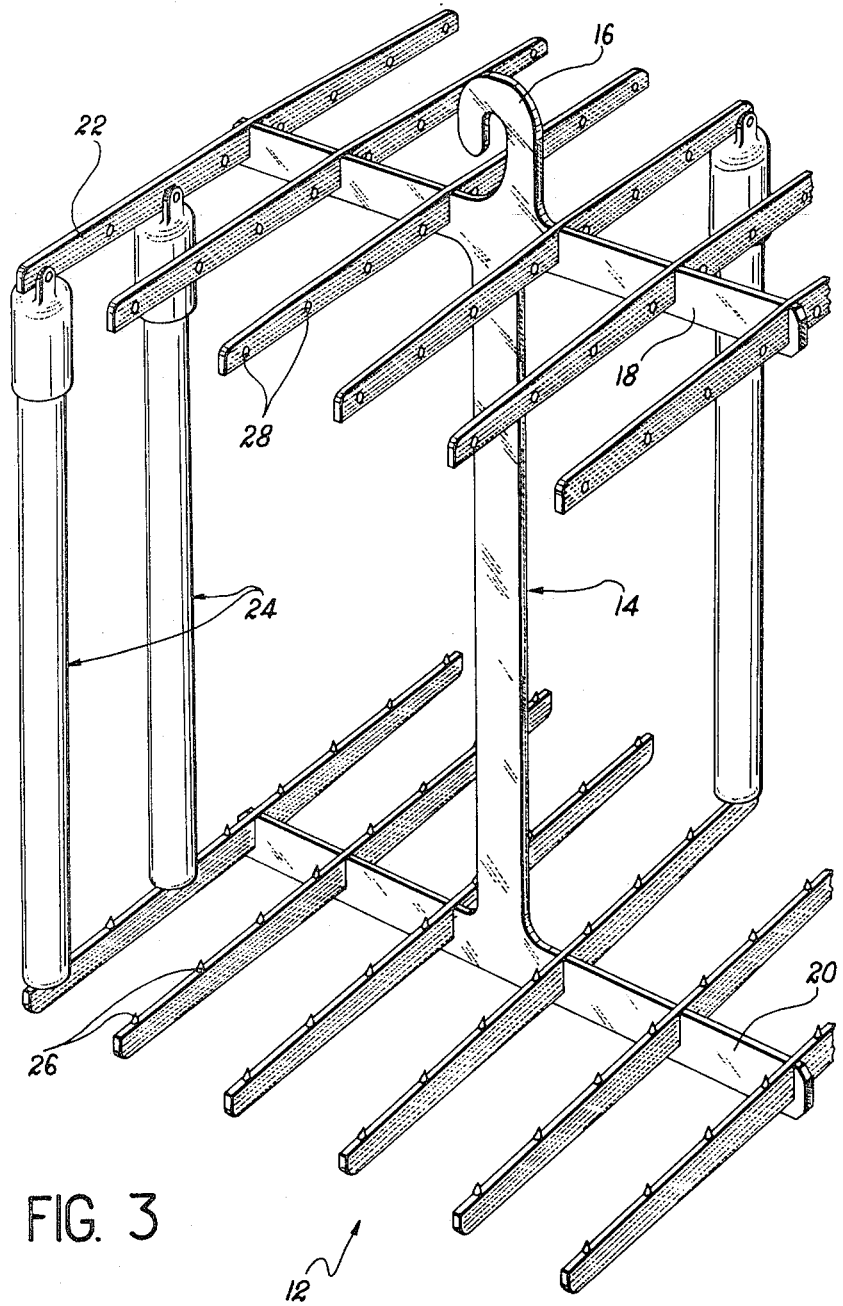
FIG. 3 is a view in perspective showing a shielding-flask cluster unit.

The cluster unit 12 which is shown in FIG. 3 has a rectangular cross-section but it is wholly apparent that said cluster units can have a cross-section of any shape such as triangular or trapezoidal. In FIG. 2, there is shown in thick lines the shape which can be given to the different cluster units in order to ensure complete coverage of the pressure vessel of the reactor core. So far as concerns the flooring element which is rigidly fixed to the small shield plug 4, said element is attached on the one hand to the ring 8 and on the other hand to the tubes 13 which surround the control rods.

The cluster unit 12 which is given by way of example in FIG. 3 is composed of an I-shaped member 14 above which is provided a grappling hook 16. Cross-members such as 22 are fixed on the top arms 18 and bottom arms 20 of the I-member 14, each shielding flask 24 being secured between a top cross-member and the corresponding bottom cross-member. Centering cones such as the cone 26 are spaced at uniform intervals along each bottom cross-member; a hole 28 has been drilled in the corresponding top cross-member in opposite relation to each centering cone 26.

Figure 4:
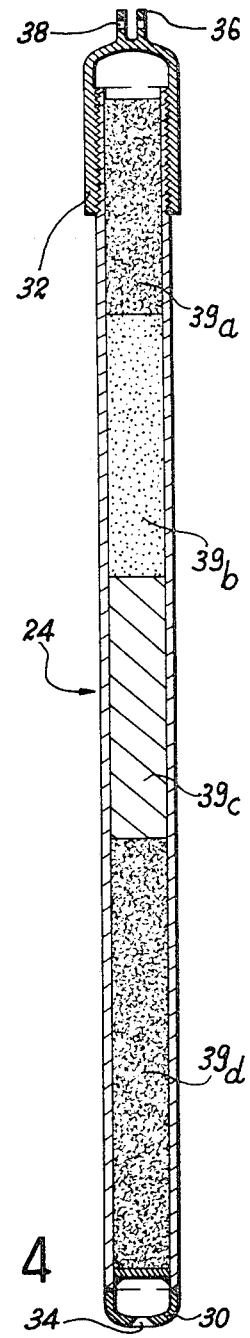
FIG. 4 is a vertical sectional view of a shielding flask.

The shielding flask 24 which is illustrated in FIG. 4 is designed in the form of a hollow cylinder, the bottom portion 30 of which is of domical shape and the top portion of which is closed by an end-cap 32 which is screwed onto the cylindrical body of the flask 24. The domical portion 30 of the flask 24 is provided at the bottom with a centering cone 34. The end-cap 32 is provided at the summit thereof with two vertical lugs 36 through which is formed a bore 38.

The flask is filled with successive layers of shielding materials. By way of example, said layers can consist from the top downwards of: graphite 39a, boron carbide 39b, stainless steel 39c, a second layer of graphite 39d. Each flask 24 is fixed on the frame of the cluster unit 12 in the followng manner: the female cone 34 of the flask 24 is engaged over the male cone 26 of the cluster unit 12; the flask 24 is attached to the top cross-member by means of a locking-pin which is engaged both within the bore 28 of said cross-member and within the bores 38 of the end-cap 32 of the flask 24. In order to change damaged shielding material, it is therefore only necessary to withdraw the locking-pin in order to detach the defective flask from the cluster unit and then to unscrew the end-cap 32. By virtue of said screwed end-cap 32, each flask can therefore serve a number of times even if part of the material contained in said flask is damaged.

FIG. 5 shows the different stages of replacement of a damaged shielding element. The nuclear reactor containment structure 40 which is closed by the two rotating shield plugs 2 and 4 is surmounted by a second containment structure 42, there being formed between these two structures an access passageway 44. The containment structure 42 is penetrated by an opening 46 located opposite to the large rotating plug 2.

Figure 5A:
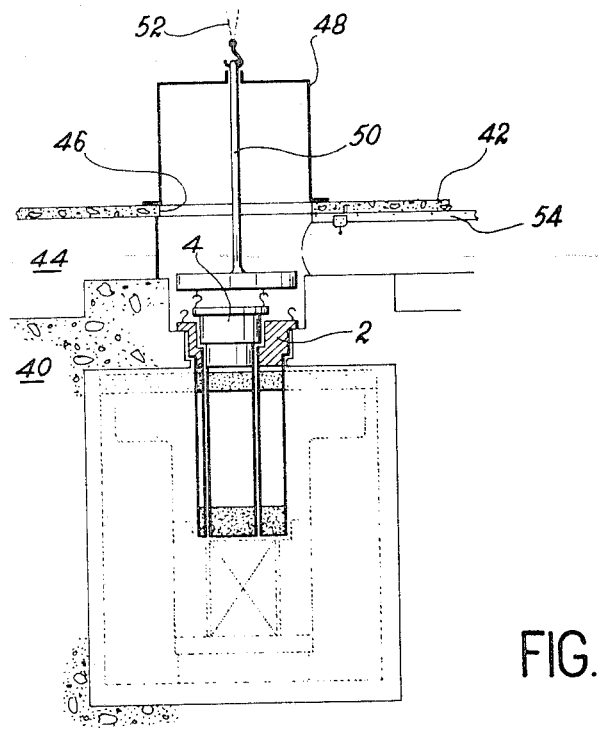
FIGS. 5a to 5d shows the different operations which are necessary in order to replace the removable shield.
Figure 5B:
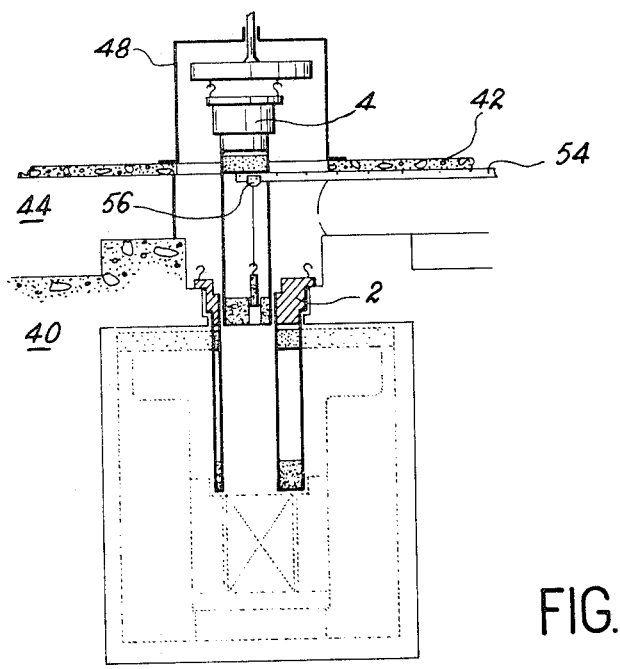

In a first stage which is shown in FIG. 5a, there is placed above the opening 46 a removable hood 48 provided internally with a lifting system 50 which is driven, for example, by a hoist 52. The lifting system 50 engages the small rotating plug 4 by means of hooks which are anchored in said plug.

Figure 5C:
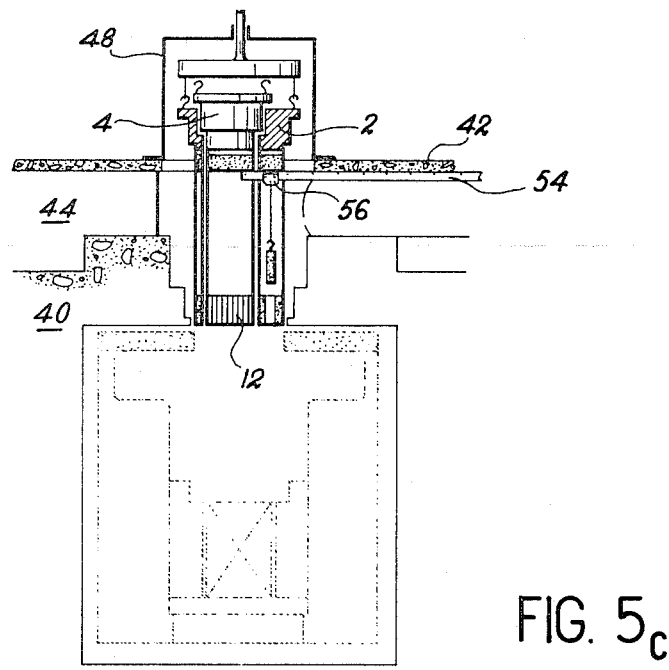
Figure 5D:
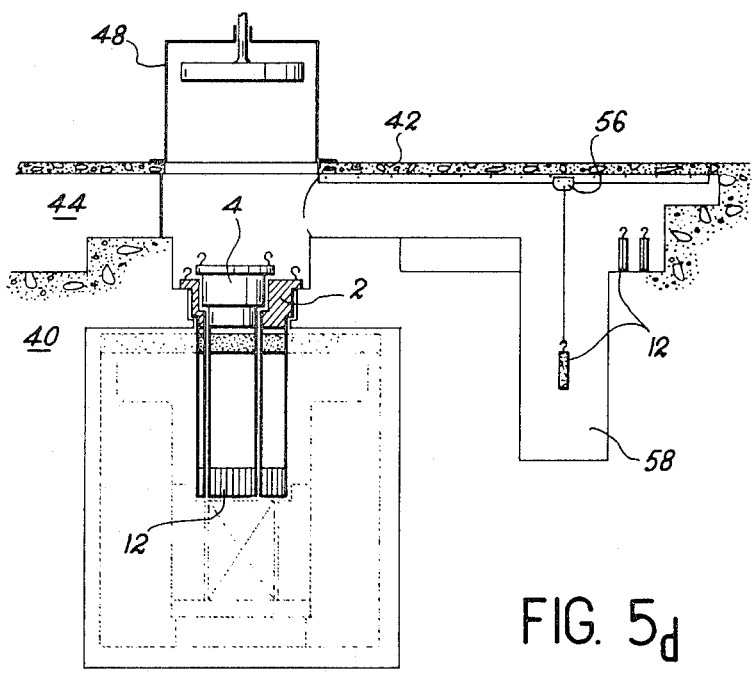

In a second stage (FIG. 5b), the small plug 4 is lifted. The monorail unit 54 which is capable of sliding with respect to the containment structure 42 is brought into position above the small rotating plug 4. The pulley-block 56 is moved into position above the cluster unit 12' to be changed. The pulley-block 56 lifts the cluster unit 12' and transfers this latter into a storage zone 58, takes a fresh cluster unit and places this latter in position. When all the damaged cluster units of the small plug 4 have been changed, the small plug 4 is returned downwards and the two rotating shield plugs are moved upwards together (FIG. 5c). The replacement of the damaged cluster units of the large shield plug 4 is carried out in the same way. The two rotating shield plugs are then replaced as shown in FIG. 5d and the hood 48 is removed.

It is readily apparent that the present invention is not limited to the embodiment which has been described by way of example with reference to the drawings and that the scope of this patent also extends to alternative forms of either all or part of the arrangements hereinbefore described which remain within the definition of equivalent means as well as to all applications of such arrangements.

What we claim is:

1. A removable top shield of the core of a sodium-cooled nuclear reactor of the integrated type and comprising two rotating shield plugs mounted in eccentric relation for closing the top portion of the reactor vessel, wherein said shield is constituted by metallic cylindrical flasks which contain the shielding elements, said flasks being assembled on a frame provided with a grappling hook at the top portion thereof, said assembly of flasks being so arranged as to constitute a cluster unit, the cluster units being in turn supported on flooring elements which are attached respectively to the large shield plug and small shield plug of the reactor by means of a metallic structural framework, said flooring elements being applied against the lateral shields of the reactor core.

2. A top shield according to claim 1, wherein the metallic flasks each have the shape of a cylinder having a domical lower end and closed at the top end by an end-cap which is screwed onto said cylinder, the domical portion of the cylinder being provided at the base thereof with a cone-shaped bore which is widened-out in the downward direction, the end-cap of each flask being provided at the summit thereof with two vertical lugs each pierced by a bore for the insertion of a locking-pin, the interior of said flasks being filled with materials which constitute the top shield of the reactor core.

3. A top shield according to claim 1, wherein each cluster unit is constituted by an I-shaped frame on which are fixed cross-members on the top arms and on the bottom arms of the I, each flask being secured to the top cross-member by means of a locking-pin and to the corresponding bottom cross-member by means of a centering cone, each cluster unit aforesaid being provided with a grappling hook at the top portion thereof.

4. A top shield according to claim 1, wherein the materials contained within each shielding flask are graphite, stainless steel and boron carbide.

* * * * *